United States Patent
Toub

(10) Patent No.: US 9,632,771 B2
(45) Date of Patent: Apr. 25, 2017

(54) ASSOCIATION OF METADATA WITH SOURCE CODE AND APPLICATIONS AND SERVICES PREMISED THEREON

(71) Applicant: Microsoft Corporation, Redmond, WA (US)

(72) Inventor: Stephen H. Toub, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/713,916

(22) Filed: Dec. 13, 2012

(65) Prior Publication Data

US 2014/0173561 A1    Jun. 19, 2014

(51) Int. Cl.
*G06F 9/44* (2006.01)
(52) U.S. Cl.
CPC . *G06F 8/73* (2013.01); *G06F 8/71* (2013.01)
(58) Field of Classification Search
None
See application file for complete search history.

(56) References Cited

U.S. PATENT DOCUMENTS

| | | | | |
|---|---|---|---|---|
| 5,649,200 A * | 7/1997 | Leblang | | G06F 8/71 707/999.202 |
| 8,219,525 B2 * | 7/2012 | Morrill | | G06F 21/6236 707/607 |
| 8,239,821 B2 * | 8/2012 | Cook et al. | | 717/104 |
| 8,434,054 B2 * | 4/2013 | Wagner | | G06F 8/71 717/101 |
| 8,555,245 B2 * | 10/2013 | Bouz | | G06F 8/68 717/106 |
| 8,589,349 B2 * | 11/2013 | Grant | | G06F 17/2288 707/638 |
| 8,607,198 B2 * | 12/2013 | Nir-Buchbinder | | G06F 11/3616 717/124 |
| 8,667,460 B2 * | 3/2014 | Khader | | G06F 8/71 7/106 |
| 8,707,262 B2 * | 4/2014 | Eska et al. | | 717/123 |

(Continued)

OTHER PUBLICATIONS

Quality—Definition and More from the Free Merriam-Webster Dictionary, online dictionary, Jan. 27, 2012.*

(Continued)

*Primary Examiner* — Daxin Wu
(74) *Attorney, Agent, or Firm* — Fiala & Weaver P.L.L.C.

(57) ABSTRACT

Systems and methods are described that enable metadata to be associated with source code at various levels of granularity (e.g., at the level of files, classes, functions, lines, statements and expressions) and that enable such metadata to be accessed independently of the source code with which it is associated. Such metadata may be used to track provenance and history of source code within and across source code repositories, associate ratings or other indicia of quality or reliability with source code, wherein such ratings may be exposed to developers and wherein such ratings may be used to better manage the automated check-in, testing and analysis of source code, and facilitate a process by which a component that manages a source code entity is notified about updates made to a related source code entity and by which like changes may be to the source code entity in a manual or automated fashion.

20 Claims, 10 Drawing Sheets

(56) References Cited

U.S. PATENT DOCUMENTS

| | | | |
|---|---|---|---|
| 8,739,119 B2* | 5/2014 | Lu | G06F 8/52 717/110 |
| 8,762,935 B2* | 6/2014 | Cook et al. | 717/104 |
| 2003/0105746 A1* | 6/2003 | Stickler | G06F 17/30011 |
| 2004/0172423 A1* | 9/2004 | Kaasten | G06F 17/30176 |
| 2005/0203935 A1* | 9/2005 | McArdle | G06F 17/24 |
| 2005/0204340 A1* | 9/2005 | Ruminer et al. | 717/123 |
| 2005/0283622 A1* | 12/2005 | Hall | G06F 21/51 713/190 |
| 2006/0026567 A1* | 2/2006 | McVoy | G06F 17/30297 7/120 |
| 2006/0123406 A1 | 6/2006 | Sudhi et al. | |
| 2006/0236301 A1 | 10/2006 | Minium et al. | |
| 2006/0259461 A1* | 11/2006 | Kapur | G06F 17/30117 |
| 2007/0006152 A1* | 1/2007 | Ahmed | G06F 8/71 7/122 |
| 2007/0130218 A1* | 6/2007 | Blumenau | G06F 17/30011 |
| 2007/0168946 A1 | 7/2007 | Drissi et al. | |
| 2008/0120602 A1* | 5/2008 | Comstock | G06F 11/3688 7/125 |
| 2008/0228762 A1* | 9/2008 | Tittizer | G06F 8/73 |
| 2008/0301639 A1* | 12/2008 | Bell | G06F 8/71 7/120 |
| 2009/0013248 A1* | 1/2009 | Hutchison | G06F 8/33 715/256 |
| 2009/0119576 A1* | 5/2009 | Pepper | G06F 17/30525 715/230 |
| 2009/0327336 A1 | 12/2009 | King et al. | |
| 2010/0058294 A1* | 3/2010 | Best et al. | 717/122 |
| 2010/0287534 A1* | 11/2010 | Vangala | G06F 11/3612 717/124 |
| 2011/0040754 A1 | 2/2011 | Peto et al. | |
| 2011/0088009 A1 | 4/2011 | Jones et al. | |
| 2012/0005156 A1* | 1/2012 | Grant | G06F 17/2288 707/608 |
| 2012/0054253 A1* | 3/2012 | Guarraci | G06F 17/30283 707/825 |
| 2012/0054728 A1* | 3/2012 | Rohde | G06F 8/71 7/168 |
| 2012/0060148 A1 | 3/2012 | Jones et al. | |
| 2012/0284231 A1* | 11/2012 | Basescu et al. | 707/638 |
| 2012/0324417 A1* | 12/2012 | Somani | G06F 8/30 717/101 |
| 2014/0095521 A1* | 4/2014 | Blount | G06F 17/30882 707/756 |

OTHER PUBLICATIONS

"Action definition_Dictionary", online dictionary, Apr. 22, 2009.*
"Authenticity Synonyms", hesaurus.com, Mar. 11, 2012.*
Dictionary definition for "indicative", Dictionary.com, Apr. 21, 2012.*
Prause, Christian R., "Maintaining Fine-Grained Code Metadata Regardless of Moving, Copying and Merging", Retrieved at <<http://ieeexploreieee.org/stamp/stamp.jsp?tp=&arnumber=5279957>>, Proceedings of the Ninth IEEE International Working Conference on Source Code Analysis and Manipulation, 2009. (SCAM '09), Sep. 20, 2009, pp. 109-118.
International Search Report & Written Opinion for PCT Patent Application No. PCT/US2013/075123, Mailed Date: May 16, 2014, Filed Date: Dec. 13, 2013, 16 Pages.
Robbes, Romain, "Mining a Change-Based Software Repository", In Fourth International Workshop on Mining Software Repositories, May, 2007, 8 Pages.
Lin, et al., "Configuration Management with Logical Structures", In Proceedings of the 18th International Conference on Software Engineering, Mar. 25, 1996, pp. 298-307.
Omori, et al., "A Change-Aware Development Environment by Recording Editing Operations of Source Code", In Proceedings of the International Working Conference on Mining Software Repositories, May 10, 2008, pp. 31-34.

* cited by examiner

ASSOCIATION OF METADATA WITH SOURCE CODE AND APPLICATIONS AND SERVICES PREMISED THEREON

BACKGROUND

In computer science, the term "source code" refers to a collection of computer instructions written using some human-readable computer language, usually as text. The source code of a computer program is specially designed to facilitate the work of computer programmers (also referred to herein as "software developers" or simply "developers"), who specify the actions to be performed by a computer mostly by writing source code. The source code is automatically translated at some point to machine code that a computer can directly read and execute. An interpreter translates the source code to machine code and executes it on the fly when the program is run, while a compiler translates the source code in advance to machine code that it stores as executable files; these can then be executed in a separate step.

The source code that constitutes a computer program is typically held in one or more text files that are stored in some form of persistent storage. For example, source code may be stored at least temporarily on a hard disk of a developer's computer. In modern software development environments, a network-accessible source control system is often used by developers to store source code in a central repository, where it can be accessed by other developers (e.g., other members of a development team). A source control system typically provides mechanisms for checking source code in and out of the central repository. This allows different developers to work on the same project, with reduced fears of lost code or overwritten changes. Source control systems often also include a version control system that can manage files through the development lifecycle, keeping track of which changes were made, who made them, when they were made, and why.

Some source control systems enable descriptive information about source code to be stored in association with the source code. This descriptive information about source code may be referred to as "metadata". Such metadata is typically associated with a source code file, or group of files. Conventional source control systems typically do not provide a means for associating metadata with a variety of different types of source code entities that are more granular than a file, such as classes, functions, lines, statements and expressions included within a source code file. Furthermore, the metadata is typically limited to historical information about the source code that may date back to the time the source code was first checked into the central repository.

Developers sometimes embed comments within their source code. Such comments may be used to provide historical information about the source code, describe the purpose of certain functionality within the source code, explain entity naming conventions used within the source code, or the like. Such comments may also be considered a form of metadata associated with source code. However, since comments are embedded within the source code itself, they cannot be accessed or manipulated without opening the source code file in which they are located. Furthermore, such comments must be formatted in a particular way that varies from programming language to programming language so that they can be properly handled by the interpreter or compiler that operates to convert the source code into an executable form. Finally, such comments typically comprise unstructured data. All of these features associated with comments (i.e., embedded in source code, language-specific formatting, and composed of unstructured data) limit their usefulness.

SUMMARY

Systems and methods are described herein that enable metadata to be associated with source code at various levels of granularity (e.g., at the level of files, classes, functions, lines, statements and expressions). Such systems and methods may also enable such metadata to be accessed independently of the source code with which it is associated. These systems and methods enable such metadata to be used in a wide range of applications and services to achieve very powerful functionality. For example and without limitation, such metadata may be used to: track provenance and history of source code within and across source code repositories; associate ratings or other indicia of quality or reliability with source code, wherein such ratings may be exposed to developers and wherein such ratings may be used to better manage the automated check-in, testing and analysis of source code; and facilitate a process by which a component that manages a source code entity is notified about updates made to a related source code entity and by which like changes may be to the source code entity in either a manual or automated fashion.

Some particular embodiments will now be described by way of example and without limitation. For example, a computer-implemented method is described herein. In accordance with the method, a determination is made that an action has been performed with respect to a first source code entity. The first source code entity comprises an item of source code within a source code file. Metadata is then generated in association with the first source code entity based upon the performance of the action. The generated metadata is then stored separately from the source code file.

In accordance with the foregoing method, determining that an action has been performed with respect to the first source code entity may comprise determining that the action has been performed with respect to one or more classes, functions, lines, statements, or expressions within the source code file.

In further accordance with the foregoing method, determining that an action has been performed with respect to the first source code entity may comprise determining that the first source code entity has been created, modified or deleted, and generating the metadata may comprise generating metadata associated with the first source code entity that comprises historical information concerning the creation, modification or deletion.

In still further accordance with the foregoing method, determining that an action has been performed with respect to the first source code entity may comprise determining that the first source code entity has been copied from a second source code entity, and generating the metadata may comprise performing one or more of: generating metadata associated with the first source code entity by copying metadata associated with the second source code entity, and generating metadata associated with the first source code entity that comprises a link to the second source code entity.

In one embodiment of the foregoing method, determining that an action has been performed with respect to the first source code entity comprises determining that a second source code entity has been copied from the first source code entity, and generating the metadata comprises generating metadata associated with the first source code entity that comprises a link to the second source code entity.

In another embodiment, the foregoing method further includes determining that a second source code entity is similar to the first source code entity and, in response to determining that the second source code entity is similar to the first source code entity, performing one or more of: generating metadata associated with the first source code entity by copying metadata associated with the second source code entity, generating metadata associated with the first source code entity that comprises a link to the second source code entity, generating metadata associated with the second source code entity by copying metadata associated with the first source code entity, and generating metadata associated with the second source code entity that comprises a link to the first source code entity.

In a further embodiment of the foregoing method, generating the metadata comprises generating one or more of structured data and unstructured data. Such structured data may comprise, for example, one or more key/value pairs.

In a still further embodiment of the foregoing method, storing the generated metadata separately from the source code file comprises storing the generated metadata in one of: a metadata file that is associated with the source code file, a data stream that is associated with the source code file, or a database.

A software development system is also described herein. The software development system includes one or more computers, a repository that stores source code files, and a metadata manager that, when executed by at least one of the one or more computers, associates metadata with source code entities included within the source code files, the metadata associated with each source code entity being indicative of a quality or reliability of the corresponding source code entity.

The foregoing system may further comprise a bug tracking system that associates bug information with each source code entity. In accordance with such an embodiment, the metadata that is associated with each source code entity may be generated based at least in part on the bug information associated with each source code entity.

The foregoing system may also comprise an analytics engine that identifies problems that occur during deployment of applications that comprise executable code generated from the source code files, associates such problems with the source code entities, and determines the metadata to be associated with each source code entity based at least in part on any problem(s) associated with the source code entity.

In another embodiment, the foregoing system includes both an automated testing system and an analytics engine. The automated testing system automatically tests each source code entity and generates test results information therefor. The analytics engine receives the test results information and determines the metadata to be associated with each source code entity based at least in part on the test results information generated for the source code entity.

In a further embodiment, the foregoing system includes an analytics engine that identifies a developer associated with each of the source code entities, obtains reputation information for each developer so identified, and determines the metadata to be associated with each source code entity based at least in part on the reputation information of the developer associated with the source code entity. In accordance with such an embodiment, the analytics engine may be operable to modify the reputation information of at least one developer based upon metadata associated with a source code entity that is associated with the developer.

The foregoing system may further include a source control system that controls a check-in policy for the source code files based on the metadata, an automated testing system that determines an amount, type and/or degree of testing or static analysis to be applied to the source code entities based on the metadata associated therewith, and/or a source code editor that exposes the metadata associated with each source code entity to a user thereof.

Another method is described herein. In accordance with the method, a determination is made that a source code entity within a first source code file has been modified. A related source code entity within a second source code file or a code store is then identified based on metadata associated with the source code entity. A notification concerning the modification is then sent to a component that manages the related source code entity. This method may further include receiving a notification concerning a modification to the related source code entity and, in response to receiving the notification concerning the modification to the related source code entity, performing one of: automatically updating the source code entity based on the modification to the related source code entity, or providing a developer with a means for updating the source code entity based on the modification to the related source code entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
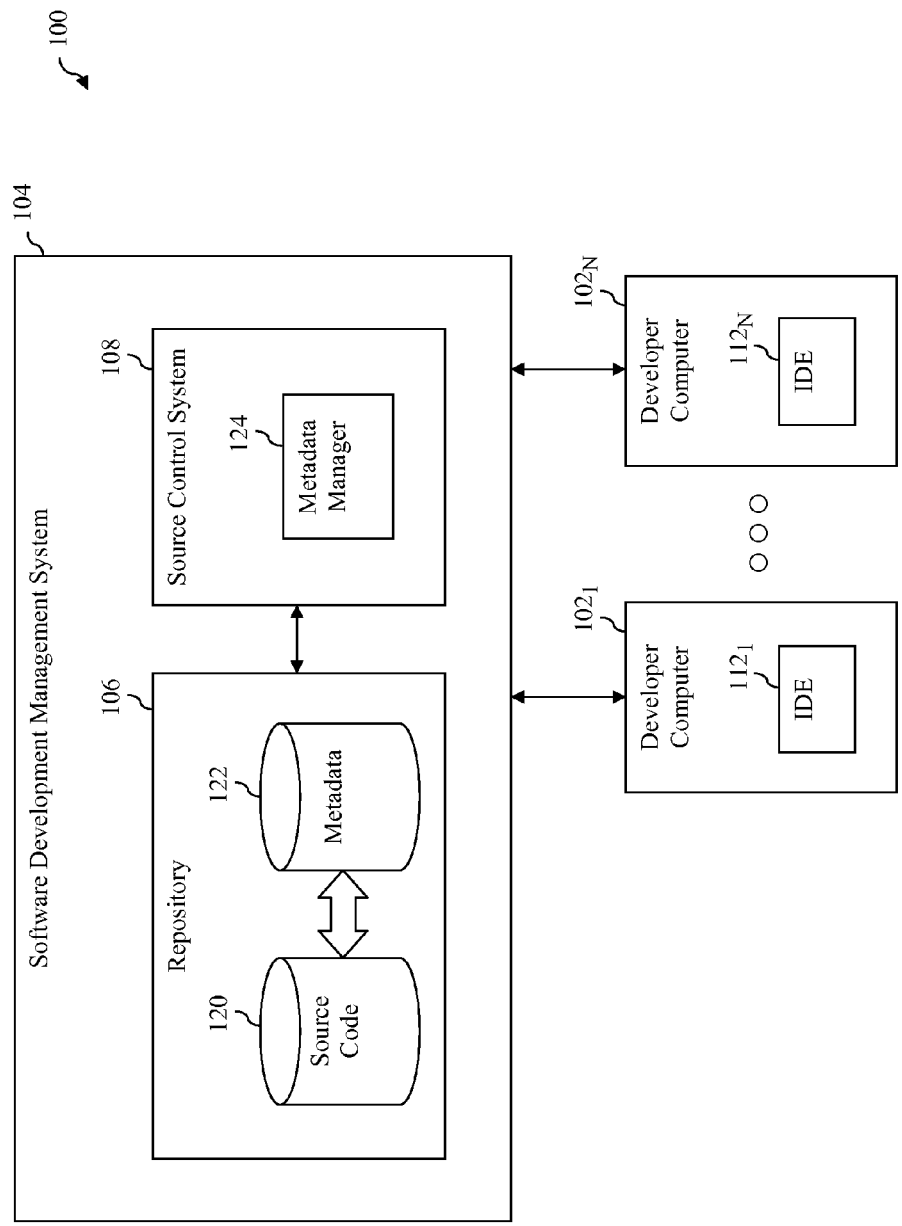
FIG. 1 is a block diagram of a software development system in accordance with an embodiment that enables metadata to be associated with source code at various levels of granularity.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems and methods are described herein that enable metadata to be associated with source code at various levels of granularity (e.g., at the level of files, classes, functions, lines, statements and expressions). Such systems and methods may also enable such metadata to be accessed independently of the source code with which it is associated. These systems and methods enable such metadata to be used in a wide range of applications and services to achieve very powerful functionality. In the following, Section II describes how metadata is associated with source code, Section III describes some example applications and services that utilize such metadata to provide advanced functionality in the environment of a software development system, Section IV describes an example processor-based computer system that may be used to implement certain features described herein, and Section V provides some concluding remarks.

II. Associating Metadata with Source Code

As noted above, a system in accordance with an embodiment enables metadata to be associated with source code at various levels of granularity, such as at the level of a file, class, function, line, statement, expression, or the like. FIG. 1 is a block diagram of an example software development system 100 that incorporates such functionality. As shown in FIG. 1, software development system 100 includes a plurality of developer computers $102_1$-$102_N$, each of which is communicatively connected to a software development management system 104.

As shown in FIG. 1, each developer computer $102_1$-$102_N$ comprises a corresponding integrated development environment (IDE) $112_1$-$112_N$ that can be executed thereon. Each IDE $112_1$-$112_N$ comprises a software application that enables a developer to perform software development tasks, such as creating and editing source code. In one embodiment, each IDE $112_1$-$112_N$ comprises a version of VISUAL STUDIO®, published by Microsoft Corporation of Redmond, Wash., although this is an example only and is not intended to be limiting.

Each IDE $112_1$-$112_N$ is capable of communicating with software development management system 104. Generally speaking, software development management system 104 comprises software executing upon one or more computers that provides services to and coordination between members of a software development team. In one embodiment, software development management system 104 comprises a version of TEAM FOUNDATION SERVER™, published by Microsoft Corporation of Redmond, Wash., although this is only an example and is not intended to be limiting.

Software development management system 104 includes a repository 106 and a source control system 108. Repository 106 is intended to broadly represent any storage system or device capable of providing persistent storage of data. Source control system 108 enables developers using IDEs $112_1$-$112_N$ to store source code in repository 106, where it can be accessed by other developers. Such source code is represented in FIG. 1 as source code 120. In an embodiment, source code 120 is stored in the form of one or more source code files. Source control system 108 provides mechanisms by which developers can check source code files in and out of repository 106. Source control system 108 may also comprise a version control system that can manage source code files through a development lifecycle.

Figure 2:
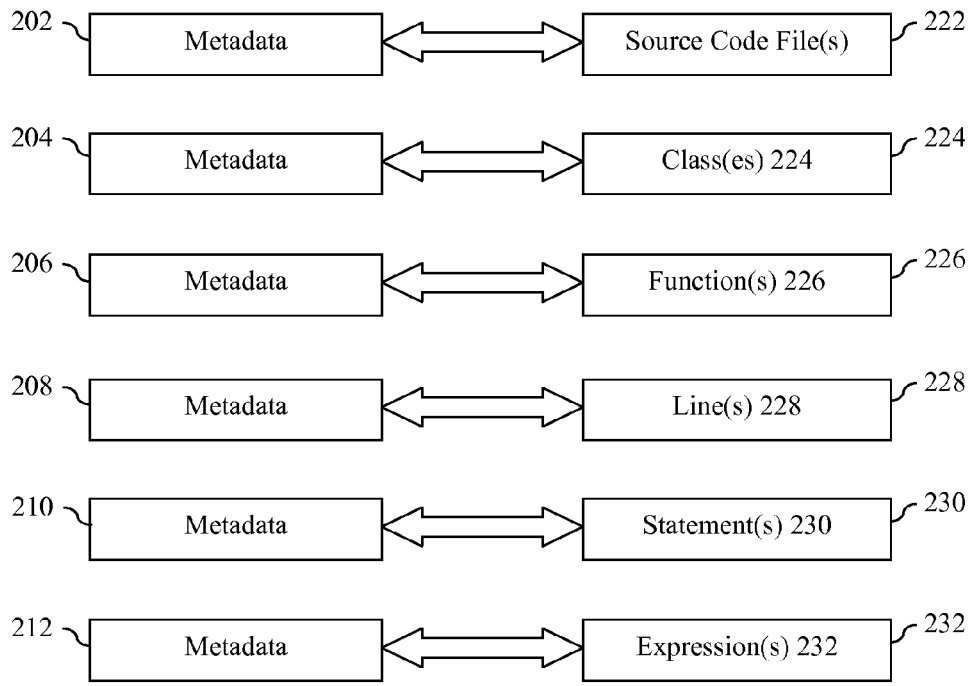
FIG. 2 illustrates some example relationships that may be maintained between metadata and source code entities in accordance with an embodiment.

As shown in FIG. 1, source control system 108 further includes a metadata manager 124. Metadata manager 124 is configured to store metadata 122 in repository 106 in association with source code 120. In accordance with an embodiment, discrete items of metadata 122 may be associated with different types of entities within source code 120. By way of example, FIG. 2 illustrates some example relationships that may be maintained between metadata and source code entities in accordance with an embodiment. As shown in FIG. 2, a relationship may be maintained between metadata 202 and one or more source code files 222, between metadata 204 and one or more classes 224, between metadata 206 and one or more function(s) 226, between metadata 208 and one or more line(s) 228, between metadata 210 and one or more statement(s) 230, and between metadata 212 and one or more expression(s) 232. However, these are only a few examples, and embodiments may maintain relationships between discrete items of metadata and source code entities other than those shown in FIG. 2.

Depending upon the implementation, the set of source code entities with which metadata may be associated may be a fixed and/or configurable aspect of software development system 100. In an embodiment in which this aspect is configurable, a suitable user interface or mechanism for performing the configuration function may be provided as part of software development management system 104, source control system 108, and/or any of IDE $112_1$-$112_N$.

Figure 3:
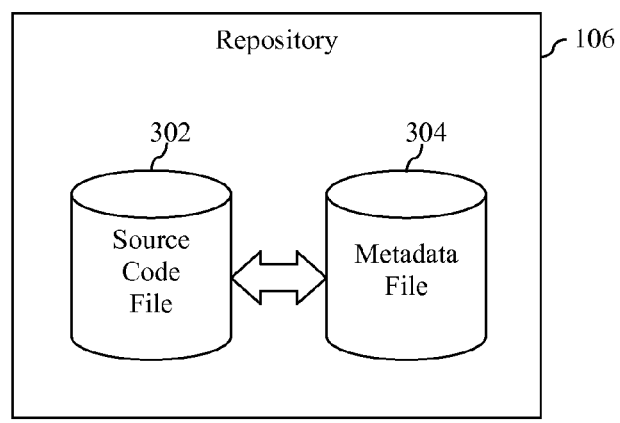
FIG. 3 is a block diagram that illustrates the maintenance of a metadata file in association with a corresponding source code file in accordance with an embodiment.

Metadata 122 may be associated with source code 120 in a variety of ways. In one embodiment, a separate metadata file is maintained for each source code file. Such an approach is illustrated in FIG. 3, in which repository 106 is shown storing a metadata file 304 in association with a source code file 302. A file naming convention may be used to link the two files. For example, source code file 302 may be named "source_code.c" and metadata file 304 may be named "source_code.metadata". However, this is merely one example, and persons skilled in the relevant art(s) will appreciate that any of a wide variety of techniques may be used to create and maintain a logical association between metadata file 304 and source code file 302.

In further accordance with the example of FIG. 3, metadata file 304 may include a mapping between various source code entities of source code file 302 (including source code file 302 itself as well various entities included therein) and metadata concerning such entities that is stored within metadata file 304. Such a mapping may enable external entities to locate within metadata file 304 metadata about a particular source code entity that exists within source code file 302. For example, metadata file 304 may include one or more entries, wherein each entry comprises an identification of a particular entity that exists within source code file 302 and metadata concerning the identified entity. In one example implementation, each entry may identify a region within source code file 302 at which a source code entity is located (e.g., by specifying a start line number, a start character number, an end line number, and an end character number, or in some other manner) and metadata associated with the source code entity located at that region. However, this is only one example, and persons skilled in the relevant art(s) will readily appreciate that a variety of different methods may be used to map between source code entities and metadata associated therewith. Furthermore, although the foregoing suggests that a mapping between source code entities and metadata associated therewith is stored in metadata file 304, it is conceivable that such mapping may be stored separately from the metadata.

A wide variety of other methods may be used to store metadata in association with source code. For example, in an embodiment in which repository 106 comprises a New Technology Files System (NTFS), source code 120 may comprise a source code file and metadata 122 may comprise an alternate NTFS data stream associated with the source code file. As another example, metadata may be stored in one or more databases that are associated with one or more source code files, wherein an indexing scheme is used to map source code entities to entries within the database(s) that contain metadata associated with the entities. However, these are merely a few examples, and still other methods may be used to associate metadata with source code entities.

In certain implementations discussed above, metadata is stored independently of the source code files with which it is associated. Such an approach advantageously enables the metadata to be accessed in a manner that does not require the source code files to also be accessed, thereby increasing the extent to which such metadata can be used independently of the source code files. However, it is noted that in alternate embodiments, the metadata may be stored in the same file as the source code with which it is associated.

Depending upon the implementation, metadata 122 may be structured (e.g., schematized) or unstructured, including holding binary blobs. In one implementation, metadata 122 comprises a predefined set of key/value pairs. Such predefined set of key/value pairs may be used, for example, for attributes that may be commonly associated with source code entities (such as pedigree, source, rating, or the like, as will be discussed in more detail herein).

In addition to storing metadata 122 in association with source code 120, metadata manager 124 may also be configured to create, update or delete metadata 122. Such operations may be performed based on certain actions taken by a developer with respect to source code 120. For example, metadata manager 124 may create and store metadata in association with a particular source code file when a developer first checks the particular source code file into repository 106. Metadata manager 124 may also update such file-level metadata whenever the particular source code file is subsequently checked out or checked back in to repository 106. Such file-level metadata may include, for example, historical information relating to the creation and updating of the source code file. Metadata manager 124 may also be configured to create, update or delete metadata associated with source code entities that are more granular than files, such as classes, functions, lines, statements, expressions, or other entities that are located within a particular source code file.

Each IDE $112_1$-$112_N$ may also include logic that is configured to create, update or delete metadata associated with a variety of source code entities. This aspect of software development system 100 will be further explained in reference to FIG. 4, which is a block diagram of a particular embodiment of developer computer $102_1$ and IDE $112_1$. In the embodiment shown in FIG. 4, IDE $112_1$ comprises at least a source code editor 402, a debugger 404, a collection of build automation tools 406, a metadata manager 408, and storage 410.

Each of source code editor 402, debugger 404 and build automation tools 406 comprise tools for developing software. In particular, source code editor 402 comprises a text editor that enables a developer to at least create and edit the source code of a computer program. Source code editor 402 may also include other features designed to simplify and/or speed up the creation/editing of source code, such as syntax checking, syntax highlighting, auto-complete and bracket matching functionality. Debugger 404 comprises a tool that can be used to detect, test and correct problems (referred to as "bugs") in computer programs. Build automation tools 406 comprise automated processes for performing a variety of software development tasks, such as compiling source code into binary code, packaging binary code, running tests, deploying code to production systems, creating documentation and/or release notes, or the like.

Storage 410 comprises a hard disk or other persistent storage system, device or medium that can be accessed by developer computer 102$_1$. Source code 420 created and/or edited using source code editor 402 may be stored in storage 410. Source code 420 may be created on developer computer 102$_1$ using source code editor 402 or may be a copy of source code that was obtained from an external source. For example, source code 420 may represent source code that was checked out of repository 106 and downloaded to storage 410 via interaction with source control system 108. A copy of source code 420 may also be checked into repository 106 via interaction with source control system 108.

Figure 4:
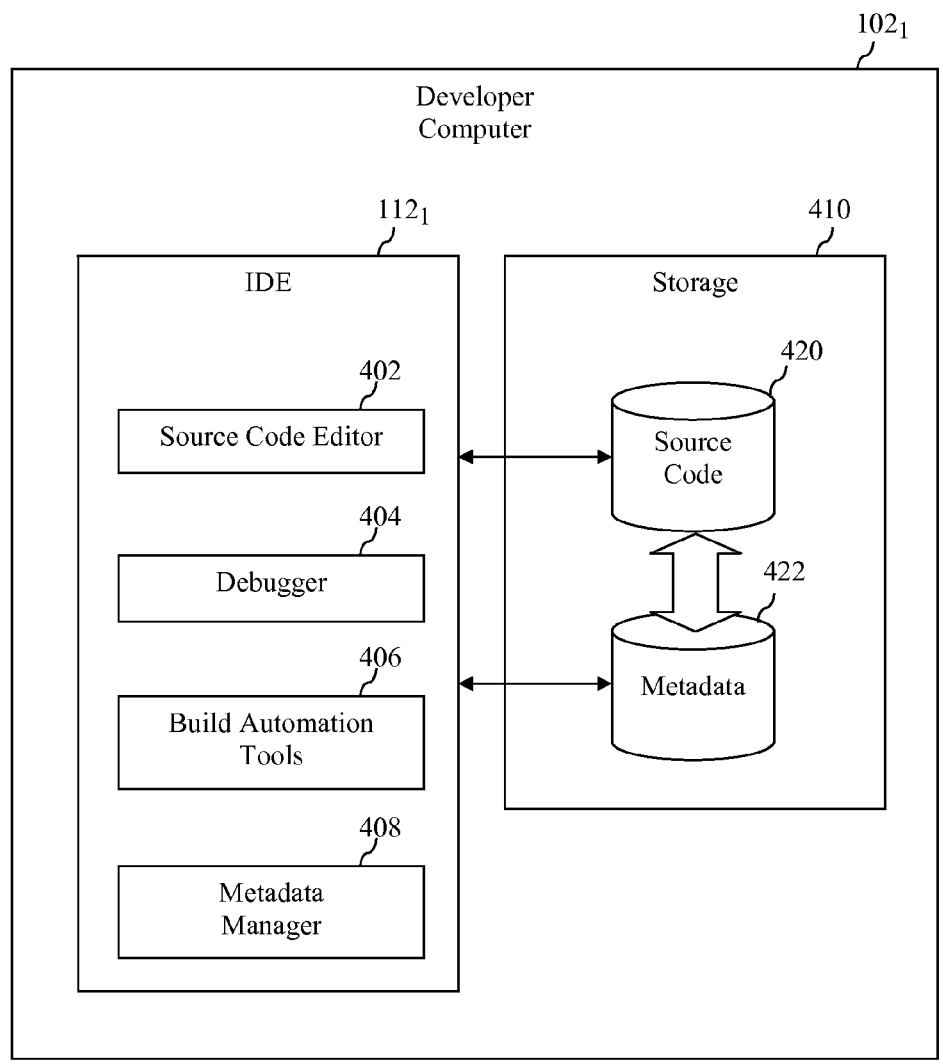
FIG. 4 is a block diagram of a developer computer that executes an integrated development environment (IDE) in accordance with an embodiment that includes a metadata manager.

As shown in FIG. 4, IDE 112$_1$ also includes a metadata manager 408. Metadata manager 408 is configured to create, modify, delete, and/or otherwise manage metadata 422 associated with source code 420. Metadata 422 may be created by metadata manager 408 when a developer first creates source code 420 within local storage 410. Alternatively, metadata 422 may be obtained from a source from which source code 420 was obtained. For example, metadata 422 may be downloaded from repository 106 to local storage 410 in a scenario in which source code 420 is also downloaded from repository 106 to local storage 410. If a copy of source code 420 is checked back into repository 106 from local storage 410, then a copy of metadata 422 associated with source code 420 may also be uploaded to repository 106.

In one embodiment, metadata manager 208 is configured to create, modify, delete or otherwise perform some other actions with respect to metadata 422 in response to certain actions taken by a developer with respect to source code 420.

For example, assume that source code 420 comprises a source code file. If a developer adds a number of lines of source code to the source code file using source code editor 402, metadata manager 408 may create metadata in association with the newly-added lines. Such metadata may indicate when the lines were added and identify the developer that added the lines. As another example, if a developer modifies a number of lines of the source code file using source code editor 202, metadata manager 208 may create or update metadata associated with the modified lines. Such metadata may indicate when the lines were modified and identify the developer that made the modifications. As yet another example, if a developer deletes a number of lines from the source code file using source code editor 202, metadata manager 208 may create or update metadata associated with the deleted lines. Such metadata may indicate when the lines were deleted and identify the developer that deleted the lines. Alternatively, metadata manager 208 may delete any metadata associated with the deleted lines.

Metadata manager 208 may also perform actions similar to those described above with respect to metadata associated with a file, a class, a function, a statement, an expression, or other source code entity in response to developer creation, modification or deletion of such entity. In one embodiment, metadata manager 208 is capable of automatically identifying the source code entity that is being acted upon (e.g., one line versus multiple lines, a statement versus an expression, or the like) and associates metadata with such identified source code entity.

Figure 5:
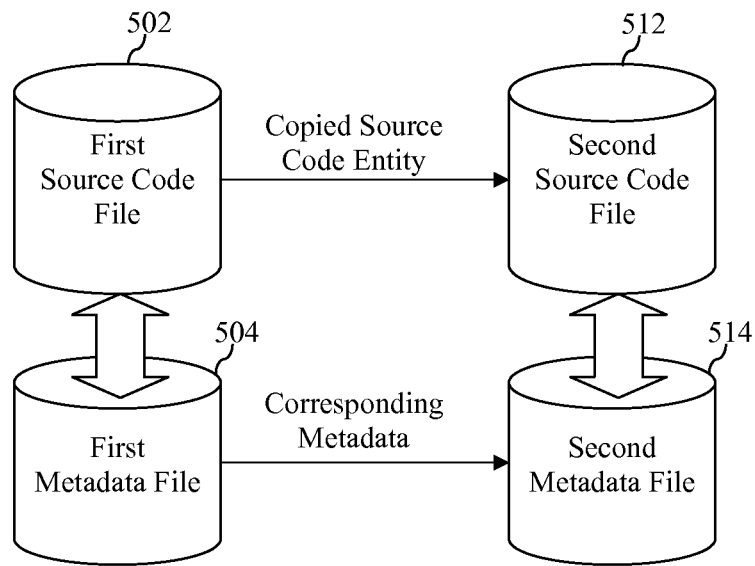
FIG. 5 is a block diagram that depicts a manner in which metadata may be copied from a first metadata file to a second metadata file in response to a copy and paste of a source code entity from a first source code file to a second source code file in accordance with an embodiment.

In further embodiments, when a developer copies and pastes source code from a first source code file having metadata associated therewith to a second source code file, metadata manager 408 may automatically perform various operations. For example, in one embodiment, if the second source code file also has metadata associated therewith, then the metadata associated with the source code copied from the first source code file may be copied to the metadata associated with the second source code file. This scenario is depicted in FIG. 5. In particular, as shown in FIG. 5, when a developer copies a source code entity (e.g., one or more classes, functions, lines, statements, expressions or the like) from a first source code file 502 and pastes the source code entity into a second source code file 512, metadata manager 408 may copy the metadata corresponding to the copied item of source code from a first metadata file 504 associated with first source code file 502 to a second metadata file 514 associated with second source code file 512.

Figure 6:
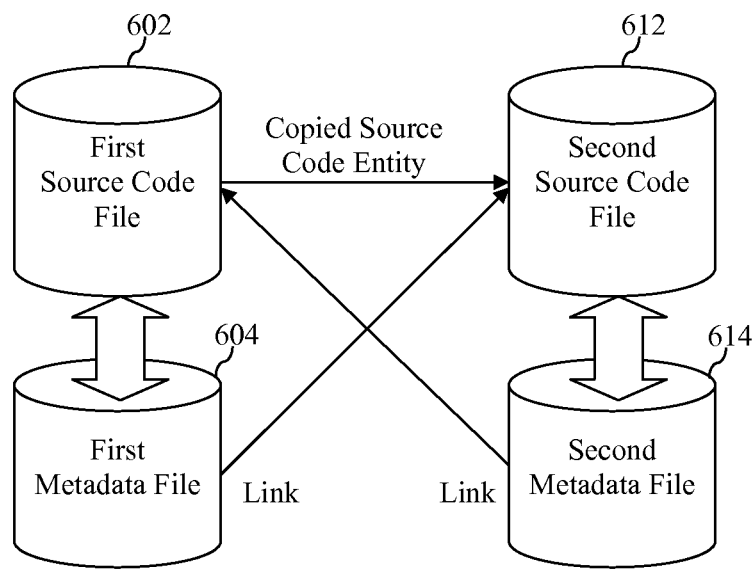
FIG. 6 is a block diagram that depicts a manner in which metadata may be used to create a link between source code that is copied from a first source code file and pasted into a second source code file in accordance with an embodiment.

In another embodiment, metadata manager 408 may use metadata to create a link between source code that is copied from a first source code file and pasted into a second source code file. This scenario is shown in FIG. 6. In particular, as shown in FIG. 6, when a developer copies a source code entity (e.g., one or more classes, functions, lines, statements, expressions or the like) from a first source code file 602 and pastes the source code entity into a second source code file 612, metadata manager 408 may generate metadata in association with the pasted source code entity that comprises a link or reference to the copied source code entity. Such metadata may be created in a second metadata file 614 associated with second source code file 612. Additionally or alternatively, metadata manager 408 may generate metadata in association with the copied source code entity that comprises a link or reference to the pasted source code entity. Such metadata may be created in a first metadata file 604 associated with first source code file 602. Still other methods may be used to create links between copied source code entities and pasted source code entities. Such linking may enable tracking of source code entities as they are copied and pasted from one source code file to another.

In a further embodiment, metadata manager 408 may implement a copy-on-write approach to handling metadata associated with copied and pasted source code entities or other interrelated source code entities. For example, in accordance with such an approach, when a developer copies a source code entity from a first source code file and pastes the source code entity in to a second source code file, metadata manager 408 may generate a link between the pasted source code entity and the copied source code entity. If the pasted source code entity is subsequently modified, then metadata manager 408 may cause the metadata associated with the copied source code entity to be copied to the metadata associated with the pasted source code entity.

Figure 7:
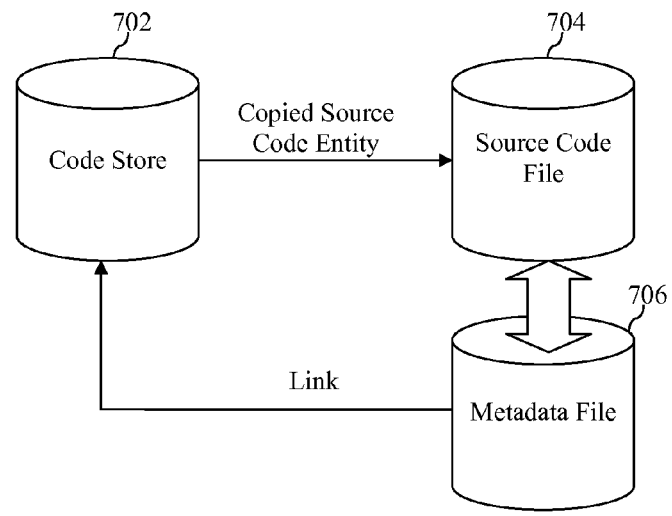
FIG. 7 is a block diagram that depicts a manner in which metadata may be used to create a link between a source code entity included in a source code file and a code store from which the source code entity was copied.

In yet another embodiment, metadata manager 408 may create metadata that links a source code entity copied from a code store to the code store from which it was copied. This scenario is shown in FIG. 7. In particular, as shown in FIG. 7, when a developer copies a source code entity from a code store 702 into a source code file 704, metadata manager 408 may create metadata that links the copied source code entity in source code file 704 to code store 702 from which it originated. Such source code may be brought in from code store 702, for example, when a developer uses a "snippets wizard" to search code store 702 for source code to achieve a particular task or in some other fashion. Such linking may enable tracking of source code entities originating from a particular code store.

Figure 8:
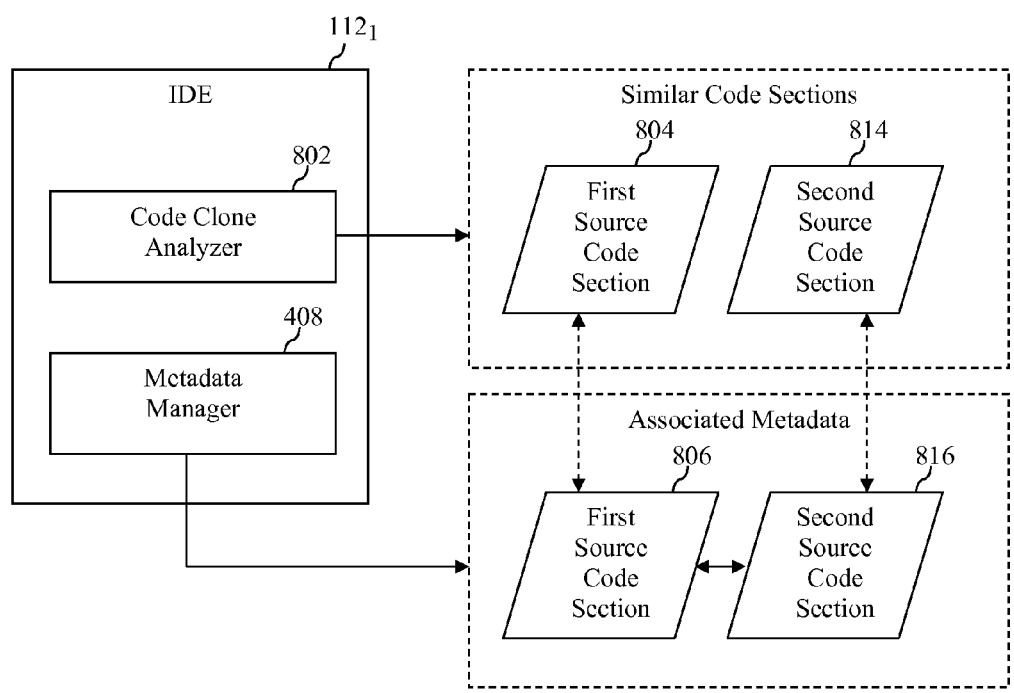
FIG. 8 is a block diagram that depicts a manner in which an IDE that includes a code clone analyzer may update metadata based on an identification of similar source code sections in accordance with an embodiment.

In a still further embodiment, metadata manager 408 may operate to transfer or link metadata associated with a first source code entity to a second source code entity that is deemed to be similar to the first source code entity. For example, as shown in FIG. 8, IDE 112$_1$ may further comprise a code clone analyzer 802 that is capable of automatically identifying similar source code sections within and across source code files. Such similar source code sections may arise, for example, due to copy and paste operations or by virtue of the fact that certain developers tend to code certain operations using a similar structure and/or style. As shown in FIG. 8, in response to the identification of similar first and second source code sections 804 and 814 by code clone analyzer 802, metadata manager 408 may cause first metadata 806 associated first code section 804 to be copied to second metadata 816 associated with second code section 814 or vice versa. Additionally or alternatively, metadata manager may create a link between the code sections in either or both of first metadata 806 and second metadata 816.

The foregoing are only a few examples of the manner in which metadata manager 208 may automatically manage metadata associated with source code entities. Metadata manager 208 may be configured to automatically create, modify or delete metadata associate with various source code entities in response to a wide variety of actions, factors or conditions.

Metadata manager 208 may also provide a user interface by which a developer can review metadata associated with various source code entities. Such a user interface may also allow a developer to manually create, update, delete or perform other actions with respect to metadata associated with various source code entities. Such user interface may be a stand-alone user interface or may comprise an integrated part of a user interface of source code editor 202 or some other component of IDE 112$_1$.

After metadata manager 208 has modified metadata 422, a developer may interact with source control system 108 to cause the updated metadata to be uploaded to repository 106. For example, in one embodiment, when a developer interacts with source control system 108 to check source code 420 into repository 106, metadata 422 associated with source code 420 may also be checked into repository 106. However, this is only one example, and a variety of techniques may be used for transferring metadata 422 to repository 106.

In an alternate embodiment, metadata 422 associated with source code 420 is maintained only in repository 106 even when source code 420 has been checked out. In accordance with such an implementation, any changes made to metadata 422 in response to a developer's actions with respect to source code 420 may be made by metadata manager 124 within source control system 108 (or some other entity within software development management system 104) in response to messages or other communications received from the IDE or other component being used by the developer to act upon source code 420.

In one implementation of software development system 100, software development management system 104 is executed on one or more backend servers and each developer computer 102$_1$-102$_N$ is capable of connecting thereto via a suitable network connection to enable interaction therewith. In alternate implementations, the functions of software development management system 104 may be provided as a cloud-based service, in which case one or more gateway servers may be interposed between developer computers 102$_1$-102$_N$ and the cloud-based infrastructure used to provide such service. In accordance with still further implementations, one or more of the features of IDEs 112$_1$-112$_N$ as described above (including the operations of metadata manager 408) may also be provided by one or more backend servers or as a cloud-based service that is accessed by a developer using a suitable interface, such as a Web browser executing on a computer or other processor-based device. Therefore, it is to be understood that the association of metadata with code as described herein as well as any related applications and services is not limited to software development system 100 but may be implemented in a variety of different systems, including systems not specifically described herein.

For example, various embodiments described herein may be implemented within the context of a distributed version control system (DVCS) that includes a plurality of distributed repositories rather than a central repository as shown in system 100.

Figure 9:
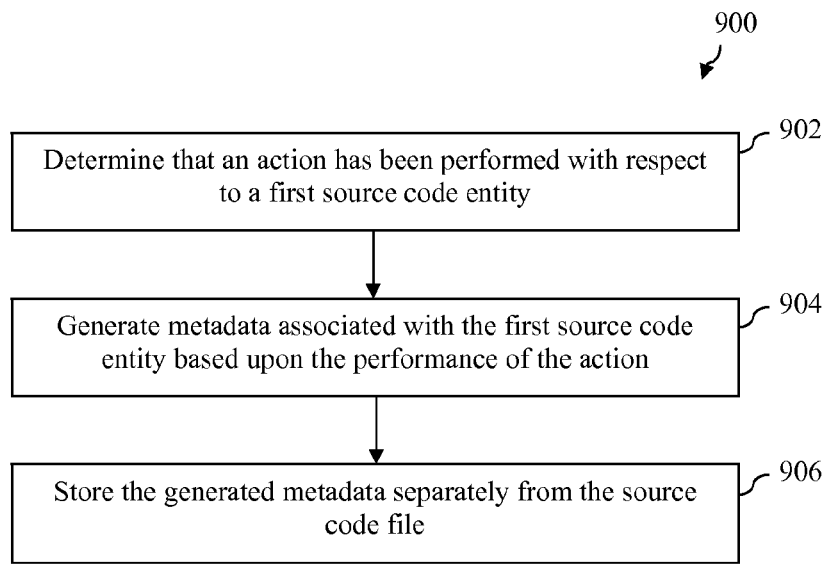
FIG. 9 depicts a flowchart of a method for generating and storing metadata associated with a source code entity in accordance with an embodiment.

To help further illustrate some of the concepts described above, FIG. 9 will now be described. FIG. 9 depicts a flowchart 900 of a method for generating and storing metadata associated with a source code entity in accordance with an embodiment. The method of flowchart 900 is presented herein by way of example only and is not intended to be limiting.

Depending upon the implementation, the steps of flowchart 900 may be performed by metadata manager 124 within source control system 108 or by metadata manager 408 within IDE 112$_1$. However, the method is not limited to those components and may also be performed by other components within software development system 100 or within other systems entirely.

As shown in FIG. 9, the method of flowchart 900 begins at step 902, in which it is determined that an action has been performed with respect to a first source code entity, the first source code entity comprising an item of source code within a source code file. Step 902 may comprise, for example, determining that the first source code entity has been created, modified or deleted, determining that the first source code entity has been copied from a second source code entity, or determining that a second source code entity has been copied from the first source code entity. The first source code entity may comprise, for example, one or more classes, functions, lines, statements, or expressions within the source code file.

At step 904, metadata is generated in association with the first source code entity based upon the performance of the action. Step 904 may comprise, for example, generating one or more of structured data and unstructured data. In an embodiment, in which structured data is generated, such structured data may comprise, for example, one or more key/value pairs.

In a scenario in which step 902 comprises determining that the first source code entity has been created, modified or deleted, step 904 may comprise, for example, generating metadata associated with the first source code entity that comprises historical information concerning the creation, modification or deletion.

In a scenario in which step 902 comprises determining that the first source code entity has been copied from a second source code entity, step 904 may comprise, for example, generating metadata associated with the first source code entity by copying metadata associated with the second source code entity and/or generating metadata associated with the first source code entity that comprises a link to the second source code entity.

In a scenario in which step 902 comprises determining that a second source code entity has been copied from the first source code entity, step 904 may comprise, for example, generating metadata associated with the first source code entity that comprises a link to the second source code entity.

At step 906, the generated metadata is stored separately from the source code file. In one embodiment, step 906 comprises storing the generated metadata in a metadata file that is associated with the source code file. In another embodiment, step 906 comprises storing the generated metadata in a data stream that is associated with the source code file. In a further embodiment, step 906 comprises storing the generated metadata in a database.

The method of flowchart 900 may further include determining that a second source code entity is similar to the first source code entity and performing one or more actions in response to determining that the second source code entity is similar to the first source code entity. Such actions may include, for example, generating metadata associated with the first source code entity by copying metadata associated with the second source code entity, generating metadata associated with the first source code entity that comprises a link to the second source code entity, generating metadata associated with the second source code entity by copying metadata associated with the first source code entity, and/or generating metadata associated with the second source code entity that comprises a link to the first source code entity.

III. Applications and Services Based on Association of Metadata with Code

The foregoing section described exemplary systems and methods for associating metadata with source code entities at various levels of granularity. As also described in the foregoing section, in certain embodiments such metadata may be accessed independently of the source code with which it is associated. This section will describe various example applications and services that are configured to operate upon and/or utilize such metadata to achieve very powerful functionality. These examples are provided herein by way of example only and are not intended to be limiting.

A. Tracking Provenance and History within and Across Source Code Repositories

Figure 10:
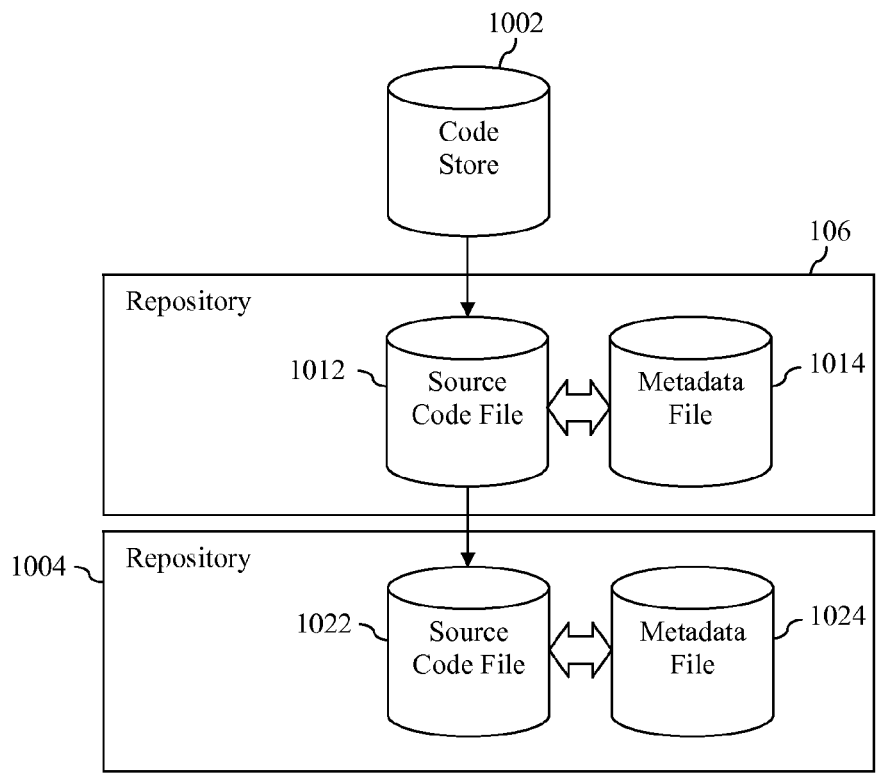
FIG. 10 is a block diagram that depicts a manner in which an embodiment utilizes metadata to track a provenance and history of source code entities as such entities are copied from a code store to a source code file and from source code file to source code file.

FIG. 10 is a block diagram that depicts a manner in which an embodiment utilizes metadata to track a provenance (i.e., origin) and history of discrete source code entities as such entities are copied from a code store to a source code file and from source code file to source code file. The following description of FIG. 10 will continue to refer to components of example software development system 100 for the sake of illustration. However, the techniques described below in reference to FIG. 10 are not limited to that system.

As shown in FIG. 10, a developer utilizing one of IDEs $112_1$-$112_N$ may cause a source code entity (e.g., a file, class, function, line, statement or expression) to be copied from a code store 1002 to a source code file 1012 that is stored within repository 106. In response to or as part of this copying operation, a metadata manager (such as metadata manager 408) may cause metadata associated with the copied source code entity to be created within a metadata file 1014, wherein metadata file 1014 is associated with source code file 1012. Such metadata may identify code store 1002 as the origin of the copied source code and provide historical information relating to the copied source code, including but not limited to when the source code was copied from code store 1002.

Subsequent to this, another developer utilizing a different IDE may copy the same source code entity (or a modified version thereof) from source code file 1012 to source code file 1022, wherein source code file 1022 is stored in a different repository 1004. In response to this copying operation, a metadata manager operating within software development system 100 or another instance thereof may cause metadata associated with the copied source code entity to be created within metadata file 1024, wherein metadata file 1024 is associated with source code file 1022. Such metadata may identify source code file 1012 and code store 1002 as origins of the copied source code and provide historical information relating to the copied source code, including but not limited to when the source code was copied from code store 1002 and when the source code was copied from source code 1012.

Thus, in the manner shown in FIG. 10, provenance and history metadata associated with a source code entity may be copied and augmented as the source code entity (or a modified version thereof) is copied from a code store to a source code file and as the source code entity (or a modified version thereof) is copied from source code file to source code file, whether such source code files are stored within the same repository or within different repositories. This enables sophisticated tracking of source code entities within and across repositories to be achieved. The foregoing method may also be used to track when a source code entity has been copied from a first source code file and pasted to multiple locations within a second source code file and when a source code entity has been copied and pasted from a first location within a source code file to a second location within the same source code file.

B. Associating Ratings with Source Code

In accordance with certain embodiments, metadata comprising an indicator of quality and/or reliability may be assigned to a source code entity. Such indicia may comprise, for example, a rating. The assignment of the rating may occur automatically based upon various characteristics of the source code entity as well as upon the occurrence of certain activities or events involving the source code entity. The assignment of the rating may also occur automatically based upon the assignment of a like rating to a similar or related source code entity. For example, when a rating associated with a particular source code entity is updated, a rating associated with an original source code entity from which the particular source code entity was copied may be automatically updated in a like fashion. As another example, when a rating associated with a particular source code entity is updated, a rating associated with one or more source code entities that were copied from the particular source code entity may be automatically updated in a like fashion.

Figure 11:
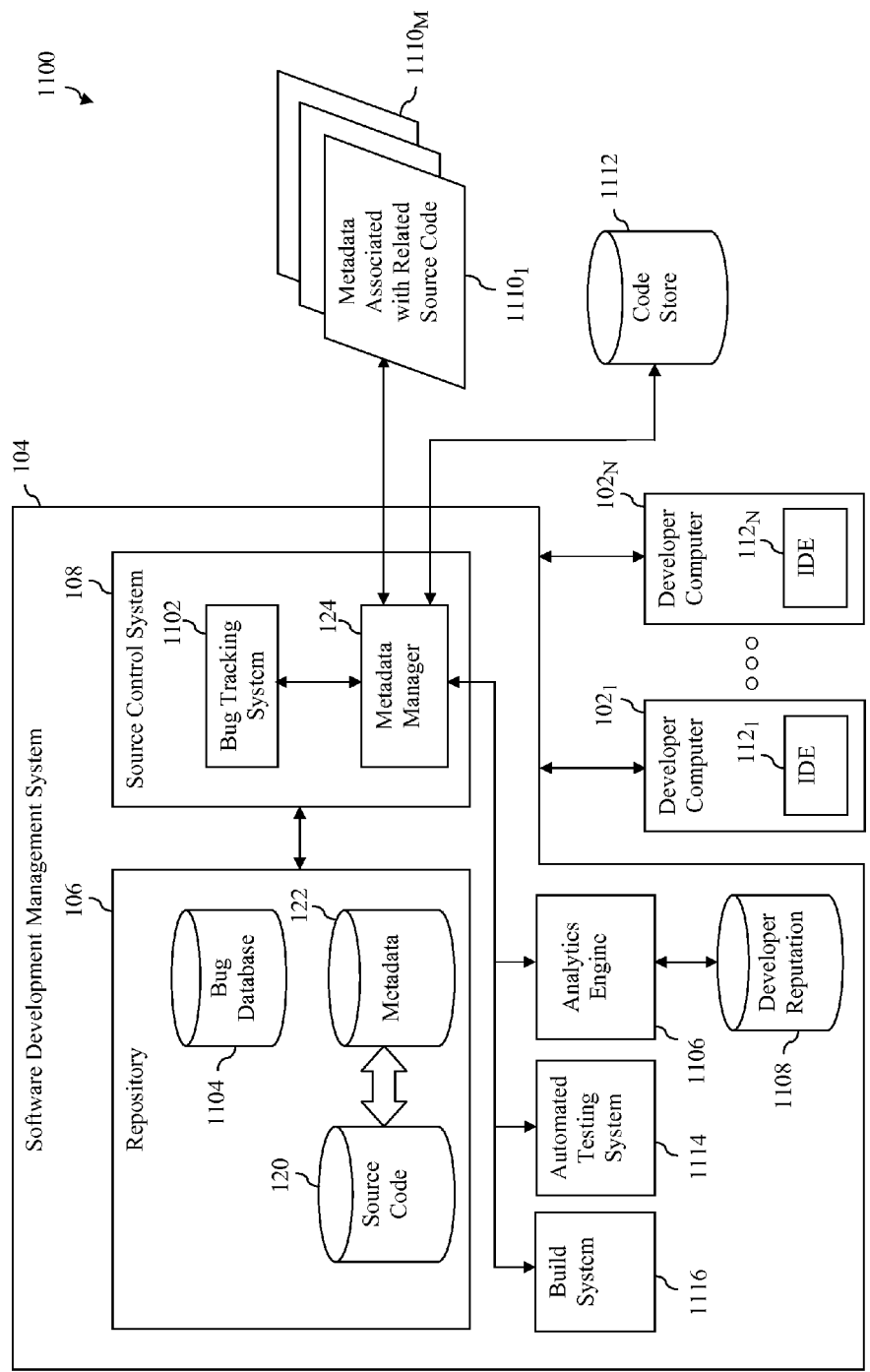
FIG. 11 is a block diagram of a software development system in accordance with an embodiment that utilizes metadata to provide various applications and services.

These concepts will now be further explained with reference to example software development system 1100 of FIG. 11. Software development system 1100 includes many of the same components as software development system of FIG. 1. However, as shown in FIG. 11, in software development system 1100, source control system 108 also includes a bug tracking system 1102. Bug tracking system 1102 may be used by developers to identify bugs (i.e., problems) associated with particular source code files as well as source code entities within such source code files. Bug tracking system 1102 may also be used by developers to provide additional information about bugs, such as whether a bug has been fixed or not, the identity of a developer that discovered or fixed a bug, the date or time at which a bug was discovered or fixed, and the like. Information concerning identified bugs and the status thereof is stored by bug tracking system 1102 in a bug database 1104. In the embodiment shown in FIG. 11, bug database 1104 is stored within repository 106 although this need not be the case.

In an embodiment, metadata manager 124 is configured to obtain information that relates bugs to certain source code entities from bug tracking system 1102 and/or bug database 1104 and to utilize such information to generate metadata for those source code entities. For example, metadata manager 124 may determine that a particular source code entity within source code 120 has a bug associated therewith based on information obtained from bug tracking system 1102 and/or bug database 1104. After obtaining such information, metadata manager 124 may generate metadata for the particular source code entity that indicates that there is a bug associated with that entity. Such metadata may also indicate whether or not the bug has been fixed, who discovered or fixed the bug, when the bug was discovered or fixed, and the like.

In a further embodiment, metadata manager 124 may assign a rating or other indicia of quality and/or reliability to the particular source code entity based on certain factors such as how many bugs have been associated with the particular source code entity, whether such bugs have been fixed, or the like, wherein the rating comprises a part of the metadata associated with the particular source code entity.

In further accordance with the foregoing embodiments, each IDE $112_1$-$112_N$ may include a component that exposes to a developer the bug information and/or rating information included in the metadata. For example, when a developer is browsing a source code file using a source code editor, such as source code editor 402, a component within the IDE may cause the bug information and/or rating associated with the source code entities included therein to be displayed to the developer. As one example, when a developer moves or hovers a pointer over a particular source code entity being displayed by the source code editor, certain bug information associated with the source code entity may appear in a bubble or other display area proximate to the source code entity. As another example, a "heat map" or other color-coding scheme may be used to distinguish regions of the source code file that have a low rating (e.g., due to having a large number of bugs associated therewith) from regions having a high rating (e.g., due to having relatively fewer bugs). These are only a few examples and persons skilled in the relevant art(s) will appreciate that a wide variety of methods may be used to display or otherwise expose the metadata to a developer both inside and outside of a source code editor. By exposing the metadata to the developer in this fashion, the developer is provided with a more comprehensive understanding of the current state of the source code and can better identify troublesome or problematic areas of the source code.

In accordance with a further embodiment, a rating associated with a source code entity can be automatically influenced by analytics. This concept will now be described with continued reference to software development system 1100 of FIG. 11. As shown therein, software development management system 104 also includes an analytics engine 1106 that is communicatively connected to metadata manager 124.

In one embodiment, analytics engine 1106 is configured to monitor deployed instances of applications comprising executable code generated from source code 120 stored in repository 106. In particular, analytics engine 1106 is configured to identify application failures, unhandled exceptions, performance regressions or other problems that occur during execution of such deployed instances, to identify a particular source code entity that gave rise to or is otherwise associated with such problem, and to cause a rating included in the metadata associated with the particular source code entity to be updated accordingly. For example, a rating of the particular source code entity may be modified to indicate a lesser quality or reliability.

Analytics engine 1106 may be configured to associate exceptions, failures, performance regressions, or other problems that occur during execution of an application with source code entities in a variety of ways. For example and without limitation, when an application crashes due to an unhandled exception, analytics engine 1106 may utilize stack trace data associated with the exception to identify a responsible source code entity. As another example, analytics engine 1106 may use tracing data generated by a debugger (such as INTELLITRACE®, a historical debugger provided as part of certain versions of VISUAL STUDIO® published by Microsoft Corporation of Redmond, Wash.) to find exceptions that occurred during execution of an application, even if the application recovered, and to identify a responsible source code entity. As yet another example, if a particular source code entity is changed and a subsequent deployment of an application that includes the modified source code entity exhibits degraded performance or some other problem, analytics engine 1106 may correlate the modification with the problem and update rating metadata associated with the modified source code entity accordingly.

Analytics engine 1106 may determine a rating to be associated with a particular source code entity based on a combination of factors. For example, analytics engine 1106 may determine the rating using a formula that takes into account a number of bugs, crashes, performance regressions, line changes and the like, that have occurred over a certain period of time and that are associated with the particular source code entity. Analytics engine 1106 may further utilize a temporal "sliding scale" such that more recent events are given greater weight than less recent events when determining a rating. In view of the foregoing, it can be seen that analytics engine 1106 may utilize very sophisticated and dynamic methods for assigning ratings to source code entities and updating the same.

Analytics engine 1106 may also be configured to determine a rating to be associated with a source code entity based at least in part on results of automated tests applied to such source code entity by an automated testing system 1114 that forms part of software development management system 104. By way of example, analytics engine 1106 may obtain data from automated testing system 1114 that indicates how many of a plurality of unit tests written for a particular source code entity are currently passing and how many are currently failing. Based at least in part on such data, analytics engine 1106 can calculate a rating for the source code entity. For example, if a majority of the unit tests are failing, then a rating that indicates poor quality or reliability may be assigned to the particular source code entity. Conversely, if a majority of the unit tests are passing, then a rating that indicates good quality or reliability may be assigned to the particular source code entity.

Analytics engine 1106 may further be configured to determine a rating to be associated with a particular source code entity by taking into account a reputation of a developer associated with the particular source code entity. For example, if a developer has a good reputation, then source code entities coded by that developer may be assigned a higher quality or reliability rating. Conversely, if a developer has a poor reputation, then source code entities coded by that developer may be assigned a lower quality or reliability rating. As shown in FIG. 11, analytics engine 1106 may obtain information relating to the reputation of the developer by accessing a developer reputation store 1108. In an embodiment, developer reputation store 1108 comprises a database or other collection of data that includes reputation information associated with one or more developers. Developer reputation store 1108 may map an identifier (ID) of a developer (e.g., an account ID or the like) with reputation information about the developer. However, reputation information about developers may be obtained in other ways as well.

In one embodiment, analytics engine 1106 is configured to determine that a developer is associated with a particular item of source code by analyzing metadata associated with the particular item of source code. For example, the metadata may include an ID of a developer that wrote, modified, manages or is responsible for the particular item of source code. However, this is only one example of a method by which an association between a developer and a particular item of source code may be determined.

A reputation of a developer may be manually or automatically determined based on a variety of factors. For example, a reputation of a developer may be determined based on personal and/or professional information associated the developer, such as level of education, academic performance, years of experience, seniority level within an enterprise, performance evaluation information, or the like.

A reputation of a developer may also be determined by automatically assessing a quality or reliability of source code entities coded by, edited by, or otherwise associated with the developer in accordance with any of the previously-described techniques for assigning a rating to a source code entity. For example, if the source code entities associated with a particular developer are determined to have very few bugs and perform well in production, then the reputation of that developer may be upgraded accordingly. Conversely, if the source code entities associated with a particular developer are determined to have many bugs and do not perform well in production, then the reputation of that developer may be downgraded accordingly. Thus, it can be seen that analytics engine 1106 can both (1) assign or modify a rating assigned to a source code entity based on a reputation of a developer associated with the source code entity; and (2) assign or modify a reputation of a developer based on a rating of source code entities associated with the developer.

When a rating associated with a particular source code entity within source code 120 is assigned or updated in any of the ways described above, metadata manager 124 of source control system 108 may operate to cause a like rating to be automatically assigned to related source code entities by modifying metadata associated with such related source code entities $1110_1$-$1110_M$. Such related source code entities may include, for example, an original source code entity from which the particular source code entity was copied or one or more source code entities that were copied from the particular source code entity. Such related source code entities may also include, for example, one or more source code entities that have been determined to be similar to the particular source code entity (e.g., using a code clone analyzer such as code clone analyzer 802 described above in reference to FIG. 8). The related source code entities may be stored within repository 106 or in other repositories. A similar approach may be used to convey other types of metadata changes from source code entity to source code entity.

Furthermore, when a rating associated with a particular source code entity that was copied from a code store 1112 is assigned or updated in any of the ways described above, metadata manager 124 of source control system 108 may operate to provide code store 1112 with information relating to the rating assignment/update. Code store 1112 may utilize such rating information in a variety of ways. For example, code store 1112 may update a rating associated with the original source code entity accordingly.

Metadata manager 124 can also update a rating associated with source code entities within source code 120 based on rating information obtained from metadata associated with related source code $1110_1$-$1110_M$ and code store 1112.

As noted above, rating metadata associated with an item of source code can be displayed or otherwise exposed to a developer via a suitable user interface component of a source code editor or other IDE component. As will now be described, such rating metadata associated with an item of source code can also be beneficially exploited by other components within a software development system.

In one embodiment, source control system 108 may be configured to control check-in policy for source code based on such rating metadata. For example, source control system 108 may be configured to require a certain number of code reviewers to review a source code file having rating metadata of a certain level associated therewith. Such a requirement may be imposed, for example, if rating metadata associated with one or more source code entities within the source file indicate a relatively low level of quality or reliability. In further accordance with such an embodiment, source control system 108 may be configured to automatically determine if the required number of code reviews have been performed when a developer attempts to check the source code file into repository 106. If the required number of code reviews has not been performed, then source control system 108 may prevent the source code file from being checked in. The number of code reviews required for different rating levels may be a configurable aspect of source control system 108.

In a further embodiment, source control system 108 may be configured to take into account the reputation of the developer attempting to check in the source code file and/or the developers performing the code reviews in determining whether a sufficient number of code reviews have been performed.

Source control system 108 may also be configured to modify a priority level of a code review of a source code entity based on rating metadata associated with the source code entity. For example, a higher priority level may be assigned to code reviews of source code entities having a rating of a certain level (e.g., a rating indicating low quality or low reliability).

The metadata rating associated with a source code entity may also be used by an automated testing system 1114 to determine an amount, type and/or degree of testing to be applied to the source code entity. For example, automated testing system 1114 may be configured to perform a greater number of automated tests within a given time period on a source code entity having a rating that indicates poor quality or reliability than are performed during the same time period on a source code entity having a rating that indicates good quality or reliability. As another example, automated testing system 1114 may automatically increase a number of machines to be used in stress testing a particular item of source code and/or the amount of time such stress testing is performed if the rating associated with that source code entity is at a certain level (e.g., a level indicative of low quality or reliability). These are only a few examples however and other methodologies may be used by automated testing system 1114 to determine an amount, type and/or degree of testing to be applied to a source code entity based upon rating metadata associated with the source code entity.

In a further embodiment, automated testing system 1114 may also be configured to use rating metadata to determine an amount, type and/or degree of static analysis to be applied to a source code entity with which the rating metadata is associated.

In a still further embodiment, automated testing system 1114 may be configured to also take into account the reputation of a developer associated with a source code entity in determining an amount, type and/or degree of automated testing or static analysis to be applied to the source code entity.

The metadata rating associated with a source code entity may also be used by analytics engine 1106 to identify source code entities that should be focused on for analysis purposes. For example, source code entities having a rating indicative of low quality or reliability may be subject to more analysis than source code entities having ratings indicative of a higher quality or reliability.

The foregoing provided only a few examples of how rating metadata associated with an item of source code can be beneficially exploited by components within a software development system, such as software development system 1100. These examples are not intended to be limiting and other methods for beneficially exploiting rating metadata associated with an item of source code may be used.

Figure 12:
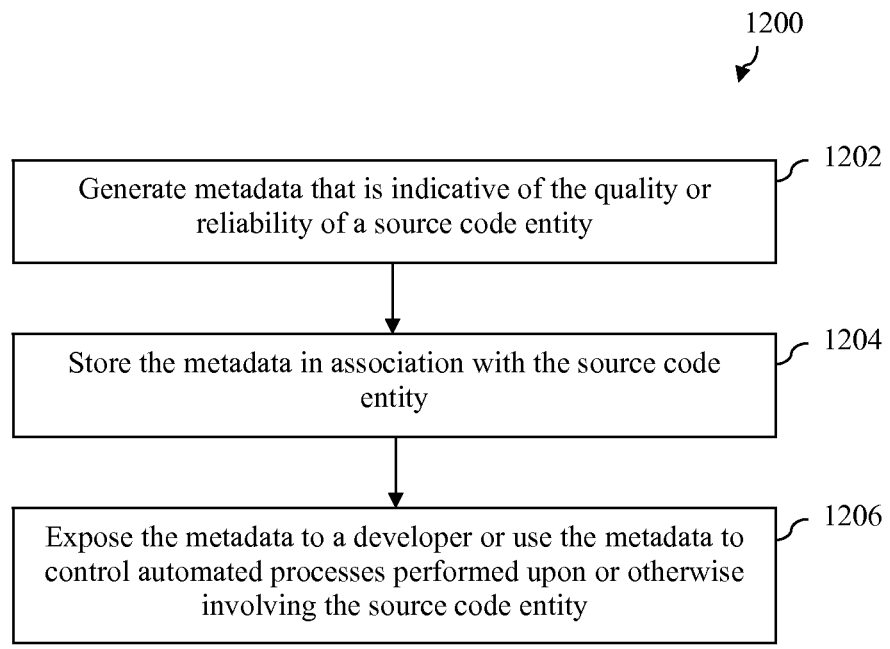
FIG. 12 depicts a flowchart of a method for generating, storing and using metadata that is indicative of the quality or reliability of a source code entity in accordance with an embodiment.

To help further illustrate some of the concepts described above, FIG. 12 will now be described. FIG. 12 depicts a flowchart 1200 of a method for generating, storing and using metadata that is indicative of the quality or reliability of a source code entity in accordance with an embodiment. The method of flowchart 1200 is presented herein by way of example only and is not intended to be limiting.

For the sake of illustration only, certain steps of flowchart 1200 are described below with continued reference to certain components of software development system 1100 of FIG. 11. However, these steps are not limited to those components and may also be performed by other components within software development system 100 or within other systems entirely.

As shown in FIG. 12, the method of flowchart 1200 begins at step 1202, in which metadata is generated that is indicative of the quality or reliability of a source code entity. With continued reference to the embodiment shown in FIG. 11, step 1202 may be performed by one or more of metadata manager 124 or analytics engine 1106.

In one embodiment, metadata manager 124 generates the metadata during step 1202 based at least in part on bug information associated with the source code entity that is obtained from bug tracking system 1102 or bug database 1104. As noted above, bug tracking system 1102 associates bug information with various source code entities within source code 120.

In another embodiment, analytics engine 1106 generates the metadata during step 1202 by identifying problems that occur during deployment of applications, associating such problems with the source code entities, and generating the metadata based at least in part on one or more problem(s) associated with the source code entity.

In a further embodiment, analytics engine 1106 generates the metadata during step 1202 by receiving test results information generated for the source code entity from automated testing system 1114 and determining the metadata based at least in part on such test results information. As previously described, automated testing system 1114 may operate to automatically test one or more source code entities within source code 120.

In a still further embodiment, analytics engine 1106 generates the metadata during step 1202 by identifying a developer associated with the source code entity (e.g., by analyzing developer metadata associated with the source code entity), obtaining reputation information for the developer so identified (e.g., by accessing developer reputation store 1108), and determining the metadata based at least in part on the reputation information of the developer associated with the source code entity. As previously described, analytics engine 1106 may also operate to modify the reputation information of a developer based upon metadata indicative of the quality or reliability of a source code entity that is associated with the developer.

At step 1204, the metadata generated during step 1202 is stored in association with the source code entity. This step may be performed, for example, by metadata manager 124 of software development system 1100.

At step 1206, the metadata stored during step 1204 is exposed to a developer or used to control automated processes performed upon or otherwise involving the source code entity. For example, a source code editor or other component within an IDE may operate to display the metadata in an explicit manner (e.g., by showing the actual metadata to the developer) or in an implicit manner (e.g., by representing the source code entity using a certain color code or other aesthetic that is related to the metadata).

In terms of using the metadata to control an automated process, as was previously described, source control system 108 may use the metadata to control a check-in policy for a source code file with which the metadata is associated. Additionally, automated testing system 1114 may determine an amount, type and/or degree of testing or static analysis to be applied to the source code entity based on the metadata associated therewith and analytics engine 1106 may identify the source code entity as an entity that should be focused on for analysis purposes based on the metadata associated therewith. Such metadata may be used to control or influence other automated processes as well.

C. Notification of Source Code Changes

In accordance with certain embodiments, metadata that links related source code entities can be used to notify a component that manages one source code entity about a modification that has been made to a related source code entity (e.g., a bug fix). Such embodiments will now be further described with continued reference to software development system 1100 of FIG. 11.

For example, when a change is applied to a particular source code entity within source code 120, metadata manager 124 may analyze metadata associated with the source code entity to identify a related source code entity. Such related source code entity may include, for example, an original source code entity from which the particular source code entity was copied or a source code entity that was copied from the particular source code entity. Such related source code entity may also include, for example, a source code entity that has been determined to be similar to the particular source code entity (e.g., using a code clone analyzer such as code clone analyzer 802 described above in reference to FIG. 8). The related source code entity may be stored within repository 106, in another repository, or in code store 1112.

After identifying the related source code entity, metadata manager 124 may send a notification concerning the change to the related source code entity or to a component that manages it, even if the related source code entity does not reside in repository 106. Whether the notification is sent may be determined based on a sharing policy. Such sharing policy may comprise a configurable feature and may be set at the file level, the developer level, the system level, or the like. A component that manages the related source code entity may also implement a sharing policy that is used to determine whether or not such notification will be received.

In a scenario in which the notification is sent to code store 1112 because the item of source code that was changed was copied from code store 1112, an owner of code store 1112 may be able to automatically or manually implement a like change to the original source code entity. Such decision may be based on a rating metadata associated with the changed source code entity and/or a reputation of the developer that made the change. Such owner may also provide a payment or incentive to the developer that made the change. Such payment or incentive may derive from a profit-sharing agreement or other compensatory mechanism.

Notifications to code store 1112 about changes to source code entities copied therefrom may be used to notify the owner of code store 1112 of a potential problem with those source code entities. Upon receiving notifications about a change to a particular item of source code, the owner of code store 1112 can cause similar notifications to be broadcast to all consumers of that particular item of source code, so that such consumers can automatically or manually implement such change.

Note that in one embodiment, an owner of code store 1112 may require (e.g., via a licensing restriction) that a developer that copies source code from code store 1112 share any updates made to the copied source code with the owner of code store 1112. Such requirement may override any non-sharing policy the developer has set in place with respect to sending notifications about changes to source code. Such an override may be automatically implemented by source control system 108 based upon notification of the requirement.

Metadata manager 124 may also receive a notification concerning a modification to a source code entity that is linked via metadata to a particular source code entity within source code 120 (e.g., by virtue of a copy-and-paste or code similarity). In response to receiving the notification, metadata manager 124 may expose information about the change to a developer (e.g., via a suitable user interface such as a user interface provided by any of IDEs $112_1$-$112_N$) and provide the developer with a means to implement a like change to the particular source code entity within source code 120. Alternatively, metadata manager 124 may automatically implement a like change to the particular source code entity within source code 120.

Whether a change must be implemented manually by a developer or is implemented automatically may be determined based on a policy accessible to metadata manager 124. Like the sharing policy discussed above, such policy may be set at the file level, the developer level, the system level or the like. Such policy may also take into account a variety of criteria. For example, such policy may disallow automatic updating of a particular source code entity in response to a change to a source code entity from which the particular source code entity was copied, if the particular source code entity has been modified since it was copied. Such policy may also take into account a rating associated with the updated source code entity and/or a reputation of a developer that implemented the update. For example, if the updated source code entity has a better rating than the copied source code entity, the change may be implemented automatically. Still other criteria may be considered.

In addition to automatically implementing a change, metadata manager 124 may also be configured to automatically perform other operations after implementing the change such as automatically performing a build that incorporates the modified source code using a build system 1116, automatically testing the revised source code using automated testing system 1114, and automatically deploying the build if the modification is determined to have a positive effect on stability. Whether such additional actions are performed may also be determined based on a policy, wherein such policy may take into account a rating associated with the updated source code entity and/or a reputation of a developer that implemented the update.

Figure 13:
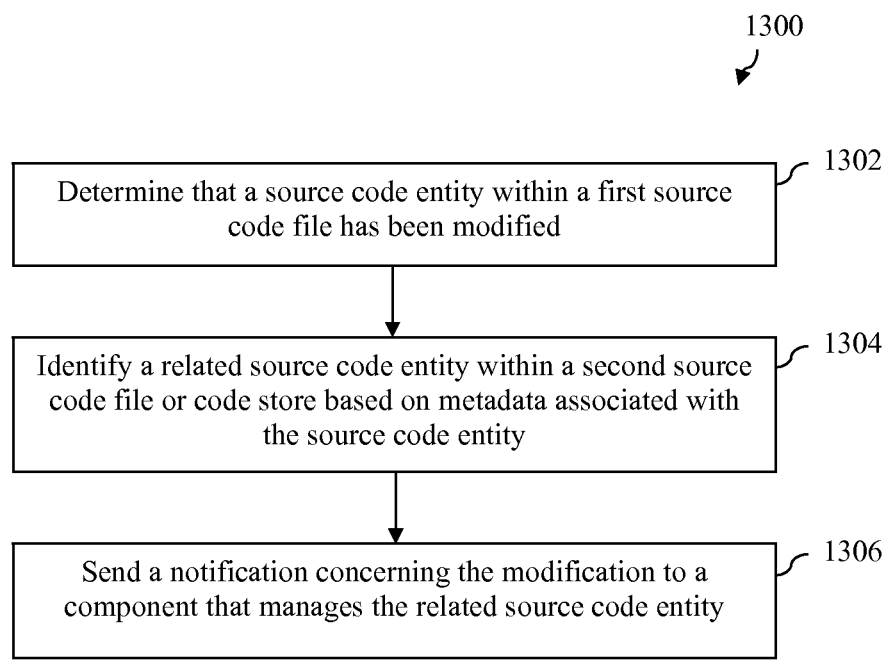
FIG. 13 depicts a flowchart of a method for using metadata that links related source code entities to notify a component that manages one source code entity about a modification that has been made to a related source code entity in accordance with an embodiment.

To help further illustrate some of the concepts described above, FIGS. 13 and 14 will now be described. FIG. 13 depicts a flowchart 1300 of a method for using metadata that links related source code entities to notify a component that manages one source code entity about a modification that has been made to a related source code entity in accordance with an embodiment. The method of flowchart 1300 is presented herein by way of example only and is not intended to be limiting.

In one implementation, the steps of flowchart 1300 may be performed by metadata manager 124 within source control system 108. However, the method is not limited to that component and may also be performed by other components within software development system 1100 or within other systems entirely.

As shown in FIG. 13, the method of flowchart 1300 begins at step 1302, in which it is determined that a source code entity within a first source code file has been modified. At step 1304, a related source code entity within a second source code file or code store is identified based on metadata associated with the source code entity. At step 1306, a notification concerning the modification is sent to a component that manages the related source code entity.

Figure 14:
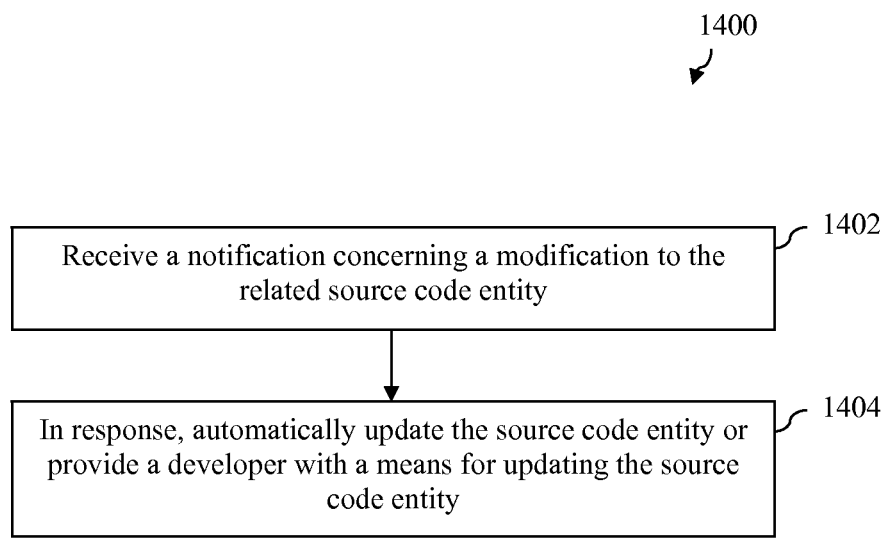
FIG. 14 depicts a flowchart of a method for updating a source code entity in response to receiving a notification concerning a modification to a related source code entity in accordance with an embodiment.

FIG. 14 depicts a flowchart 1400 of a method for updating a source code entity in response to receiving a notification concerning a modification to a related source code entity in accordance with an embodiment. The method of flowchart 1400 is presented herein by way of example only and is not intended to be limiting.

In one implementation, the steps of flowchart 1400 may be performed by metadata manager 124 within source control system 108. However, the method is not limited to that component and may also be performed by other components within software development system 1100 or within other systems entirely.

As shown in FIG. 14, the method of flowchart 1400 begins at step 1402, in which a notification concerning a modification to the related source code entity is received. At step 1404, in response to receiving the notification, the source code entity is either automatically updated based on the modification to the related source code entity (e.g., the source code entity is modified in a like manner to the related source code entity) or a developer is provided with a means for updating the source code entity based on the modification to the related source code entity. For example, the developer may be presented with an option to modify the source code entity in a like manner to the related source code entity via a user interface of an IDE, source code editor, or other software development tool.

III. Example Processor-Based System Implementation

Figure 15:
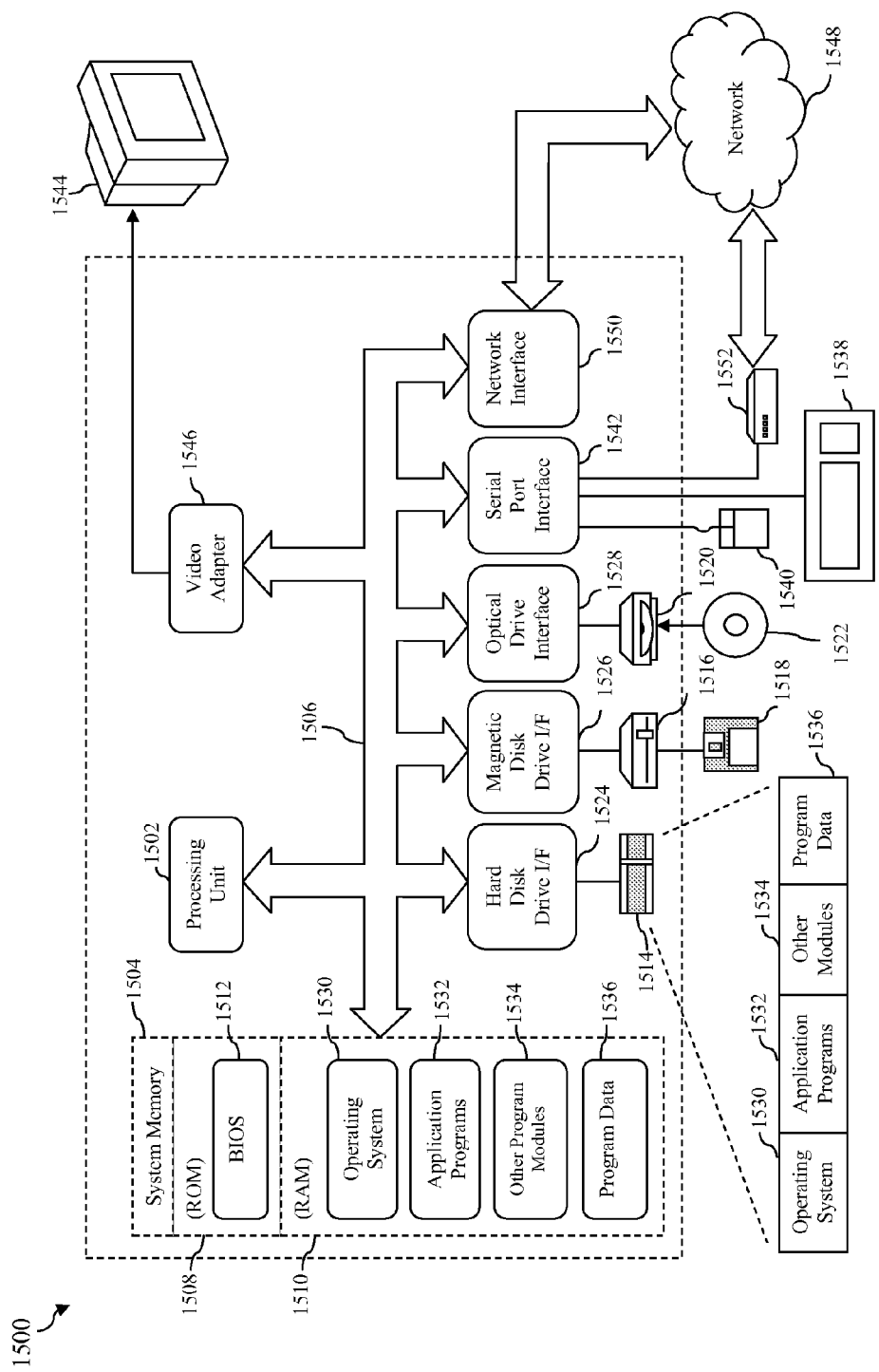
FIG. 15 is a block diagram of an example processor-based computer system that may be used to implement various embodiments.

FIG. 15 depicts an example processor-based computer system 1500 that may be used to implement various embodiments described herein. For example, system 1500 may be used to implement any of developer computers $102_1$-$102_N$ and software development management system 104 as described above in reference to FIGS. 1, 3, 4, 8 and 11 as well as any components executed thereby or included therein. The description of system 1500 provided herein is provided for purposes of illustration, and is not intended to be limiting. Embodiments may be implemented in further types of computer systems, as would be known to persons skilled in the relevant art(s).

As shown in FIG. 15, system 1500 includes a processing unit 1502, a system memory 1504, and a bus 1506 that couples various system components including system memory 1504 to processing unit 1502. Processing unit 1502 may comprise one or more processors or processing cores. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

System 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, BLU-RAY™ disk or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1530, one or more application programs 1532, other program modules 1534, and program data 1536. In accordance with various embodiments, the program modules may include computer program logic that is executable by processing unit 1502 to perform any or all of the functions and features of any of developer computers $102_1$-$102_N$ and software development management system 104 as described above in reference to FIGS. 1, 3, 4, 8 and 11 as well as any components executed thereby or included therein. The program modules may also include computer program logic that, when executed by processing unit 1502, performs any of the steps or operations shown or described in reference to the flowcharts of FIGS. 9 and 12-14.

A user may enter commands and information into system 1500 through input devices such as a keyboard 1538 and a pointing device 1540. Other input devices (not shown) may include a microphone, joystick, game controller, scanner, or the like. In one embodiment, a touch screen is provided in conjunction with a display 1544 to allow a user to provide user input via the application of a touch (as by a finger or stylus for example) to one or more points on the touch screen. These and other input devices are often connected to processing unit 1502 through a serial port interface 1542 that is coupled to bus 1506, but may be connected by other interfaces, such as a parallel port, game port, or a universal serial bus (USB).

A display 1544 is also connected to bus 1506 via an interface, such as a video adapter 1546. In addition to display 1544, system 1500 may include other peripheral output devices (not shown) such as speakers and printers.

System 1500 is connected to a network 1548 (e.g., a local area network or wide area network such as the Internet) through a network interface or adapter 1550, a modem 1552, or other suitable means for establishing communications over the network. Modem 1552, which may be internal or external, is connected to bus 1506 via serial port interface 1542.

As used herein, the terms "computer program medium," "computer-readable medium," and "computer-readable storage medium" are used to generally refer to media such as the hard disk associated with hard disk drive 1514, removable magnetic disk 1518, removable optical disk 1522, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1532 and other program modules 1534) may be stored on the hard disk, magnetic disk, optical disk, ROM, or RAM. Such computer programs may also be received via network interface 1550, serial port interface 1542, or any other interface type. Such computer programs, when executed or loaded by an application, enable computer 1500 to implement features of embodiments of the present invention discussed herein. Accordingly, such computer programs represent controllers of the computer 1500.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

In alternative implementations, any of developer computers $102_1$-$102_N$ and software development management system 104 as described above in reference to FIGS. 1, 3, 4, 8 and 11 as well as any components executed thereby or included therein may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-implemented method, comprising:
    determining, by a processing device, that a first source code entity has been copied to create a second source code entity, the first source code entity comprising an item of source code within a first source code file and the second source code entity comprising an item of source code within a second source code file;
    generating metadata associated with the first source code entity based upon the copying, the generated metadata comprising a link to the second source code entity;
    determining that a modification has been made to the first source code entity subsequent to the copying; and
    responsive to the determining, utilizing the link to notify a component that manages the second source code entity of the modification.

2. The method of claim 1, wherein the first source code entity comprises:
    one or more classes, functions, lines, statements, or expressions within the first source code file.

3. The method of claim 1, further comprising:
    determining that the first source code entity has been created, modified or deleted, and
    generating additional metadata associated with the first source code entity that comprises historical information concerning the creation, modification or deletion.

4. The method of claim 1, further comprising:
    generating metadata associated with the second source code entity by copying metadata associated with the first source code entity.

5. The method of claim 1, further comprising:
    determining that the first source code entity has been copied to create a third source code entity, and
    generating additional metadata associated with the first source code entity that comprises a link to the third source code entity.

6. The method of claim 1, further comprising:
    determining that a third source code entity is similar to the first source code entity; and
    in response to determining that the third source code entity is similar to the first source code entity, performing one or more of:
        generating metadata associated with the first source code entity by copying metadata associated with the third source code entity,
        generating metadata associated with the first source code entity that comprises a link to the third source code entity,
        generating metadata associated with the third source code entity by copying metadata associated with the first source code entity, and
        generating metadata associated with the third source code entity that comprises a link to the first source code entity.

7. The method of claim 1, wherein the generating comprises generating one or more of structured data and unstructured data.

8. The method of claim 7, wherein the generating of structured data comprises generating one or more key/value pairs.

9. The method of claim 1, further comprising storing the generated metadata separately from the source code file by storing the generated metadata in one of:
    a metadata file that is associated with the source code file;
    a data stream that is associated with the source code file; or
    a database.

10. A computer-implemented method comprising:
    copying a source code entity from within a first source code file to create a related source code entity;
    determining, by a processing device, that the source code entity within the first source code file has been modified subsequent to the copying;
    responsive to the determining, identifying the related source code entity within a second source code file or a code store based on metadata associated with the source code entity that is generated based on the copying; and
    sending a notification concerning the modification to a component that manages the related source code entity based on a link to the related source code entity in the metadata.

11. The method of claim 10, further comprising:
    receiving a notification concerning a modification to the related source code entity; and
    in response to receiving the notification concerning the modification to the related source code entity, performing one of:
        automatically modifying the source code entity based on the modification to the related source code entity; or
        providing a developer with a means for updating the source code entity based on the modification to the related source code entity.

12. A computer-readable storage device having program instructions recorded thereon that, when executed by a processing device, perform a method, the method comprising:
    determining, by the processing device, that a first source code entity has been copied to create a second source code entity, the first source code entity comprising an item of source code within a first source code file and the second source code entity comprising an item of source code within a second source code file;
    generating metadata associated with the first source code entity based upon the copying, the generated metadata comprising a link to the second source code entity;
    determining that a modification has been made to the first source code entity subsequent to the copying; and
    responsive to the determining, utilizing the link to notify a component that manages the second source code entity of the modification.

13. The computer-readable storage device of claim 12, wherein the first source code entity comprises:
    one or more classes, functions, lines, statements, or expressions within the first source code file.

14. The computer-readable storage device of claim 12, the method further comprising:

determining that the first source code entity has been created, modified or deleted, and generating additional metadata associated with the first source code entity that comprises historical information concerning the creation, modification or deletion.

15. The computer-readable storage device of claim 12, the method further comprising:

generating metadata associated with the second source code entity by copying metadata associated with the first source code entity.

16. The computer-readable storage device of claim 12, the method further comprising:

determining that the first source code entity has been copied to create a third source code entity, and generating additional metadata associated with the first source code entity that comprises a link to the third source code entity.

17. The computer-readable storage device of claim 12, the method further comprising:

determining that a third source code entity is similar to the first source code entity; and in response to determining that the third source code entity is similar to the first source code entity, performing one or more of:

generating metadata associated with the first source code entity by copying metadata associated with the third source code entity, generating metadata associated with the first source code entity that comprises a link to the third source code entity, generating metadata associated with the third source code entity by copying metadata associated with the first source code entity, and generating metadata associated with the third source code entity that comprises a link to the first source code entity.

18. The computer-readable storage device of claim 12, wherein the generating comprises generating one or more of structured data and unstructured data.

19. The computer-readable storage device of claim 18, wherein the generating of structured data comprises generating one or more key/value pairs.

20. The computer-readable storage device of claim 12, the method further comprising storing the generated metadata separately from the source code file by storing the generated metadata in one of:

a metadata file that is associated with the source code file;

a data stream that is associated with the source code file; or a database.

* * * * *